United States Patent [19]

Mahapatra

[11] Patent Number: 4,886,538

[45] Date of Patent: Dec. 12, 1989

[54] PROCESS FOR TAPERING WAVEGUIDES

[75] Inventor: Amaresh Mahapatra, Acton, Mass.

[73] Assignee: Polaroid Corporation, Cambridge, Mass.

[21] Appl. No.: 267,440

[22] Filed: Nov. 4, 1988

Related U.S. Application Data

[63] Continuation of Ser. No. 78,589, Jul. 28, 1987, abandoned.

[51] Int. Cl.$^4$ .............................................. C03C 21/00
[52] U.S. Cl. ..................................... 65/30.13; 65/30.1; 65/111; 264/1.3; 264/1.4; 264/2.7; 350/96.12
[58] Field of Search .................... 65/3.14, 30.13, 30.1, 65/111, 2; 264/1.3, 1.4, 1.5, 1.7, 2.6, 2.7; 350/96.12

[56] References Cited

U.S. PATENT DOCUMENTS

| | | | |
|---|---|---|---|
| 3,888,648 | 6/1975 | West | 65/30.13 |
| 3,997,687 | 12/1976 | Phillips | 427/12 |
| 4,002,998 | 1/1977 | Conwell et al. | 331/94.5 |
| 4,037,005 | 7/1977 | Phillips | 427/162 |
| 4,123,483 | 10/1978 | Nakahara et al. | 264/1 |
| 4,277,271 | 7/1981 | Krohn | 65/3 |
| 4,310,339 | 1/1982 | Blankenship | 264/2.7 |
| 4,557,742 | 12/1985 | Thigpen | 65/2 |
| 4,641,913 | 2/1987 | Nishiwaki et al. | 350/96.11 |
| 4,662,711 | 5/1987 | Tada et al. | 350/96.12 |

FOREIGN PATENT DOCUMENTS

| | | | |
|---|---|---|---|
| 2630975 | 1/1977 | Fed. Rep. of Germany | 65/3.14 |
| 57-135906 | 8/1982 | Japan | 350/96.12 |
| 57-179055 | 11/1982 | Japan | 65/30.13 |
| 60-256101 | 12/1985 | Japan | 65/111 |

OTHER PUBLICATIONS

Viljanen, J.; Appl. Phys. 24, No. 1 (Jan.) 61–63, 1981.
Webster's New World Dictionary, College Addition, 1964, The World Publishing Company, p. 1490.
Dielectric Tapers with Curved Axes and No Loss, by Enrique A. J. Marcatili, IEEE Journal of Quantum Electronics, vol. QE-21, No. 4, Apr. 1985.
Passive 3-Branch Optical Power Divider by K+-Ion Exchange in Glass, by M. Haruna et al, Elec. Lett, 6/6/85, vol. 21, No. 12, pp. 535–536.
Integrated Optical Ring Resonators Made by Silver Ion-Exchange in Glass, by R. G. Walker et al, Applied Optics, 4/1/83, vol. 22, No. 7, pp. 1029–1035.
High Finesse Ring Resonators–Fabrication and Analysis, A. Mahapatra et al, SPIE vol. 651, Integrated Opt. Circuit Engineering III (1986), pp. 272–275.

*Primary Examiner*—Kenneth M. Schor
*Attorney, Agent, or Firm*—Francis J. Caufield

[57] ABSTRACT

A process for forming a channel waveguide in which the channel geometry and the channel index of refraction vary oppositely along the channel length to keep the modal characteristic of the channel uniform uses non-uniform heating of a channel waveguide to cause non-uniform diffusion of the channel dopant. In one embodiment, the channel is passed under a laser at a non-uniform rate to expose the channel to different numbers of laser pulses.

6 Claims, 1 Drawing Sheet

PROCESS FOR TAPERING WAVEGUIDES

CROSS-REFERENCE TO RELATED APPLICATION

This is a continuation of application Ser. No. 078,589, filed July 28, 1987, and now abandoned.

FIELD OF THE INVENTION

This invention relates to channel waveguides useful at optical wavelengths.

BACKGROUND OF THE INVENTION

In optical waveguide systems, there is a need for a coupling channel waveguide whose width continuously varies from one dimension to another over a relatively short length of the waveguide. This need may arise, for example, when the waveguide is used to couple a single mode optical fiber whose core has one dimension to an optical waveguide whose channel width has a different dimension. To couple efficiently, the waveguide used for coupling should be relatively lossless and remain a single mode waveguide despite the change in its channel width between the two dimensions. The latter consideration requires that the index of refraction along the channel vary inversely with the change in its geometry. These factors pose problems.

In particular, if the desired change in channel width is achieved simply by forming, by the normal photolithographic techniques, a channel whose width tapers gradually between the two dimensions needed, the index of refraction of the channel guide tends to remain uniform along the length of the tapered region because the concentration of the impurity added to form the index of refraction change in the channel tends to be uniform along such length. As a consequence, because the width of the channel varies along such length while the index of refraction remains uniform along the length, the modal properties along the region of taper vary. What is needed to maintain the modal properties essentially constant along the length where the channel width varies is a compensating change in the index of refraction along such length.

The problem is especially critical with waveguides that use a large index of refraction change between the channel and its substrate to achieve tight confinement of energy in the channel. The large index change results in a large modal mismatch between the relatively narrow single mode channel waveguides useful in integrated circuit devices and the typically wider optical fibers that are often coupled to such channel waveguides.

SUMMARY OF THE INVENTION

The present invention is directed to a process for forming a channel waveguide whose width and depth can be varied in any desired manner along its length, typically to taper in continuous fashion from a relatively wide dimension to a relatively narrow dimension over a short length, and in which the index of refraction in the channel along such length varies in a manner to compensate for the change in geometry. As a result, the modal properties of the channel remain essentially uniform over the length and a single mode signal applied as an input at one end of the tapered channel length can pass through to the other end with little mode conversion and insignificant loss.

In this process, there is first prepared, by any one of the known techniques, a waveguide channel of uniform width and uniform concentration of the dopant or impurity used to effect the index of refraction change. The uniform width advantageously is chosen to match the narrower of the dimensions involved. Then the portion of the channel whose width and depth is to be changed is subjected to non-uniform heating along its length for a time and at a temperature such that there is effected along such length a prescribed non-uniform diffusion of the dopant or impurity. The heating tends to diffuse the impurity outwards from the channel at a rate determined by the temperature to increase its width and depth. The non-uniform heating is chosen to unalter the width of the channel at one end of the coupling region while widening it at the other end. Moreover, because the same amount of dopant or impurity will merely have been spread over a wider waveguide volume, the increase in volume will have been compensated for by a corresponding decrease in the index of refraction. Various ways are feasible for providing the desired non-uniform heating. In a preferred embodiment, successive limited portions of the channel region involved are irradiated with localized laser pulses, the number of pulses and/or the intensity of pulses applied to successive portions varying from one end of the region to the other end to provide a continuous change in width and depth of the channel. This technique is attractive because of the high degree of control possible, which permits reshaping the original channel both widthwise and depthwise.

DETAILED DESCRIPTION OF THE DRAWINGS

The invention will be better understood from the following more detailed description taken with the accompanying drawings in which.

DETAILED DESCRIPTION OF THE INVENTION

Figure 1:
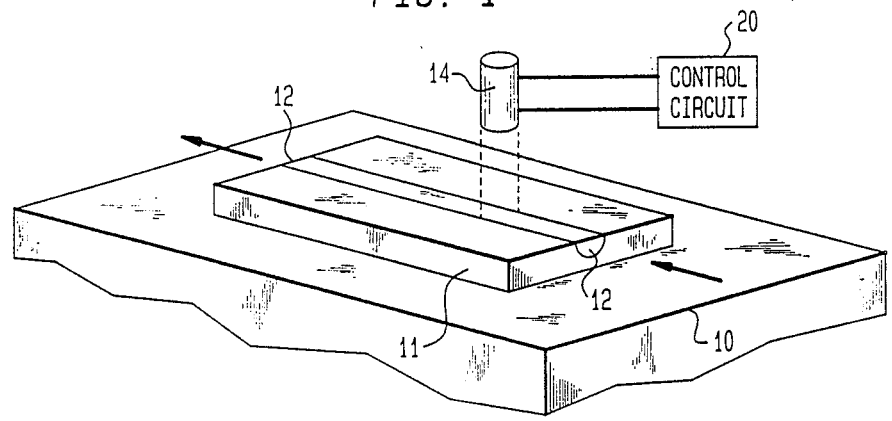
FIG. 1 shows schematically in perspective form laser apparatus for heating a channel waveguide non-uniformly in accordance with one embodiment of the invention.

Referring now to FIG. 1, there is shown schematically a platform 10 which can be stepped a prescribed distance at a time in the direction indicated by the arrows and at a rate determined by a suitable control system (not shown) in the manner familiar to workers in the art of processing microelectronic devices. The control system permits the platform to dwell at each position a prescribed period of time that may be different at different positions. Typically, the desired dwell time at each position is stored in a program supplied to the control system before the process is begun so that it can proceed automatically.

Positioned on the platform to move with it is the workpiece, substrate 11 within which has previously been formed a channel waveguide 12 in any of the ways known for forming an optical channel waveguide. For example, the channel waveguide may have been formed by an ion exchange process in a silicate glass substrate such as soda lime. This would typically have been done after suitable masking to cover all its surface except the elongated narrow portion in which the channel is formed. Afterwards, the substrate is immersed for a suitable time, for example about 52 minutes, in molten silver nitrate at about 270° C. to exchange sodium in the soda-lime glass for silver in the bath. Consequently, there is formed along the exposed portion of the substrate a narrow elongated channel that is doped with silver. The silver doping increases the index of refraction in the channel selectively above that of the undoped glass, whereby the channel serves as an optical waveguide. This process tends to result in an index of refraction change which is gradual. For a step index of refraction change, it is feasible to use an electric field-assisted ion exchange process in which the glass substrate is dipped in a silver nitrate electrolyte while the bottom surface of the glass substrate is covered with a metal electrode maintained at a negative potential with respect to the electrolyte. This process can be carried out at lower temperatures than the first described ion exchange process so that thermal diffusion effects are reduced and a sharper almost step gradient can be achieved in the silver concentration profile in the formed channel.

It is of course feasible to substitute for ions other than sodium in the glass and/or to use dopants other than silver for the substitution to form the waveguide, as is known to workers in the art.

Alternatively, the waveguide 12 could have been formed in a ferroelectric substrate such as lithium niobate using a proton exchange process.

A laser 14 coupled to a control circuit 20 is positioned over the platform such that successive portions of the channel 12 in substrate 11 pass under the laser so that the laser output beam is incident at a given time on a limited region of the channel. There is chosen for use a laser whose output wavelength and beam size is appropriate to the channel being heated. In particular, one choses a laser whose output wavelength is within the absorption band of the substrate. Optics may be included (not shown) to focus the output beam of the laser on the channel (which of course includes adjustment of the spot size). The laser may be operated either in a continuous wave mode or in a pulsed mode. Accordingly, by appropriately programming the stepping of the platform, any desired dwell time of the laser beam on a particular portion of the channel may be obtained. In accordance with the invention, a desired taper in the width of the channel is achieved by appropriate variable heating of the channel by the laser beam. Typical applications would be to widen a channel region about two microns wide at one end to between five and six microns wide at the other end over a distance of between one and ten millimeters. It is usually desirable to keep the length of the taper short in the interest of compactness. However, too abrupt a change in width may lead to a waveguide which is extra lossy, especially to desirable single mode transmission therethrough. An advantageous rate of change in the width would be one which satisfies the criteria for an adiabatic change that are set forth in a paper entitled, "Dielectric Tapers with Curved Axis and No Loss" by E. A. J. Marcatili. *IEEE Journal of Quantum Electronics* VQE-21, 307 (1985).

It is a consequence of the thermal diffusion process involved in the heating technique described that as the outward diffusion of the dopant widens the channel, the concentration of the dopant in the widened channel is decreased, since effectively the same number of dopant ions are spread over a larger volume. It is known that the modal content of a channel waveguide is related to the product of the width of the channel and the index of refraction change, and that the latter is proportional to the dopant concentration in the channel. Accordingly, if the width of the channel is increased by the thermal diffusion but its dopant concentration is reduced by the same ratio, the modal content of the channel waveguide remains essentially unchanged.

Moreover, it is characteristic of the laser heating technique described that the heating can be largely localized near the top surface of the glass substrate whereby the desired widening and deepening of the channel can be achieved.

Figure 2:
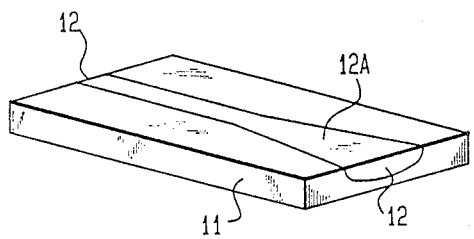
FIG. 2 shows the channel waveguide after being treated in the apparatus of FIG. 1.

In FIG. 2, there is shown a typical result of the treatment described with reference to FIG. 1. The channel 12 in the glass substrate 10 has been modified to include the tapered region 12A which widens from its original width of typically 2 microns to an enlarged width typically 4.7 microns, over a length of about 5 millimeters. The original guide which acts as a single mode guide at a wavelength of 0.8 microns remains a single mode guide despite the change in channel width.

There are of course various other forms of non-uniform heating that can be used instead of that already described. For example, the arrangement shown in FIG. 1 could be modified to vary appropriately the intensity of the laser as successive portions of the channel moved past, either at a uniform rate or a non-uniform rate.

Alternatively, the localized heating could be provided by a heated filament, instead of a laser, past which was moved the channel.

Figure 3:
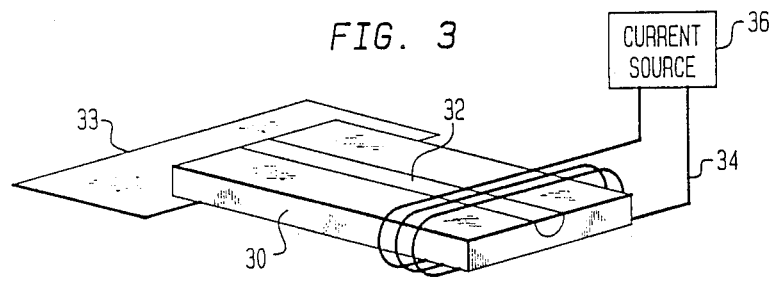
FIG. 3 shows alternative apparatus for heating a channel waveguide non-uniformly in accordance with another embodiment of the invention.

Still another possible technique is depicted schematically in FIG. 3 in which a glass substrate 30, including a channel 32, is mounted to keep one end in a fixture that includes a support 33 maintained at one temperature for keeping that end of the glass substrate essentially at that temperature. Typically, the end of the substrate would be clamped to the support for a low thermal resistance connection. The other end of the glass substrate 30 is positioned in a hotter zone depicted by the heating coil 34, to which is supplied heating current from the current source 36. By keeping the two ends of the glass substrate at different temperatures, a desired monotonic temperature gradient can be established along the substrate to cause different widths of out diffusion of the dopant along the channel to achieve the desired taper in the channel width. The spacing between turns of the heating coil can be varied to help achieve a desired temperature profile along the channel even in the heating zone. Typically, the cold end may be kept at about 200° C. and the hot end kept at about 300° C. A time of between fifteen and thirty minutes has been used to provide a widening of between two and four times of the hot end of the channel. This technique will tend also to result in a commensurate increase in the channel depth at the hot end. As previously mentioned, it is usually desirable to maintain the temperature at the cold end sufficiently low that little diffusion occurs at such end.

It should be apparent at this point that various other techniques are feasible for performing the desired non-uniform heating. These include pulling a narrow heating element along at a varying rate to keep successive portions of the substrate in the heating zone gradually shorter or gradually longer times.

Moreover, it should be apparent that the principles of the invention can be used with a variety of substrates so long as the dopant used to form the waveguide diffuses appropriately in the substrate at temperatures convenient to use and tolerable by the substrate.

In particular, the invention is similarly applicable to channel waveguides formed in crystals, such as lithium niobate or lithium tantalate, in which the channel is formed by proton exchange to be quite narrow for tight confinement of the optical energy.

Moreover, in some instances, it may be advantageous to include a number of parallel channel waveguides in a common substrate and to widen portions of each of the channels in a common non-uniform heating procedure of the kind described.

Additionally, it should be apparent that the localized controlled diffusion technique, for example, as described in connection with FIG. 1, can be used first to widen a channel and then to taper the widened channel back to the normal width so that any desired variation with length along the channel above the original width can be achieved.

Moreover, even though the inventive process is particularly suitable for use in making tapered structures for coupling single mode waveguides while preseving their single mode nature, it should be apparent that it also can be used for other applications where tapered waveguides would be useful such as for coupling multimode guides to reduce insensitivity to tolerance variations.

I claim:

1. A process for making a waveguide whose cross-section changes along its length to enhance coupling, said process comprising the steps of:

initially forming an elongated channel waveguide having exposed ends structured for coupling, said elongated channel waveguide being formed in a substrate and provided with a predetermined lengthwise cross-sectional geometry having a predetermined width by selectively doping the substrate with ions of a species that raises the index of refraction of the substrate, the concentration of said index raising species of ions and the width of said cross-section both being constant over the length of the waveguide; and selectively applying heat along said elongated channel waveguide to change its cross-sectional geometry and dopant per unit volume concentration of said index raising ion species as a function of length along a selected length of said waveguide by further diffusing said index raising ion species widthwise and depthwise in said substrate while retaining the initial cross-section and concentration along the remaining length of the waveguide the lengthwise distribution of said applied heat being such that the product of the concentration of said index raising ion species taken as dopant per unit volume of substrate and the width of said waveguide at any lengthwise section of the waveguide remains constant along the length of the waveguide so that the modal content of said waveguide remains unchanged throughout the length of said waveguide while its cross-sectional geometry changes from one end thereof to the other so that said waveguide ends can be coupled with external devices of matching geometry and modal content; the selectively applying step providing a taper in said channel waveguide.

2. The process of claim 1 wherein said step of selectively applying heat to said channel waveguide comprises directing the output from a laser at said channel waveguide to selectively heat it while relatively moving said substrate and the laser with respect to one another.

3. The process of claim 2 additionally comprising the steps of either changing the spot size from the laser, its power output, or focus of the laser beam or any combination of these while the substrate and the laser are moved relative to one another.

4. The process of claim 1 wherein the variation of the cross-sectional geometry of said waveguide and the concentration of said index raising ion species along the length of said channel waveguide are such that said channel waveguide is substantially lossless or adiabatic.

5. The process of claim 1 in which the substrate is selected from the group of silicate glasses and ferroelectric materials 6. The process of claim 1 in which the taper extends over a length of up to one centimeter along said channel waveguide.

* * * * *